Figure 1:
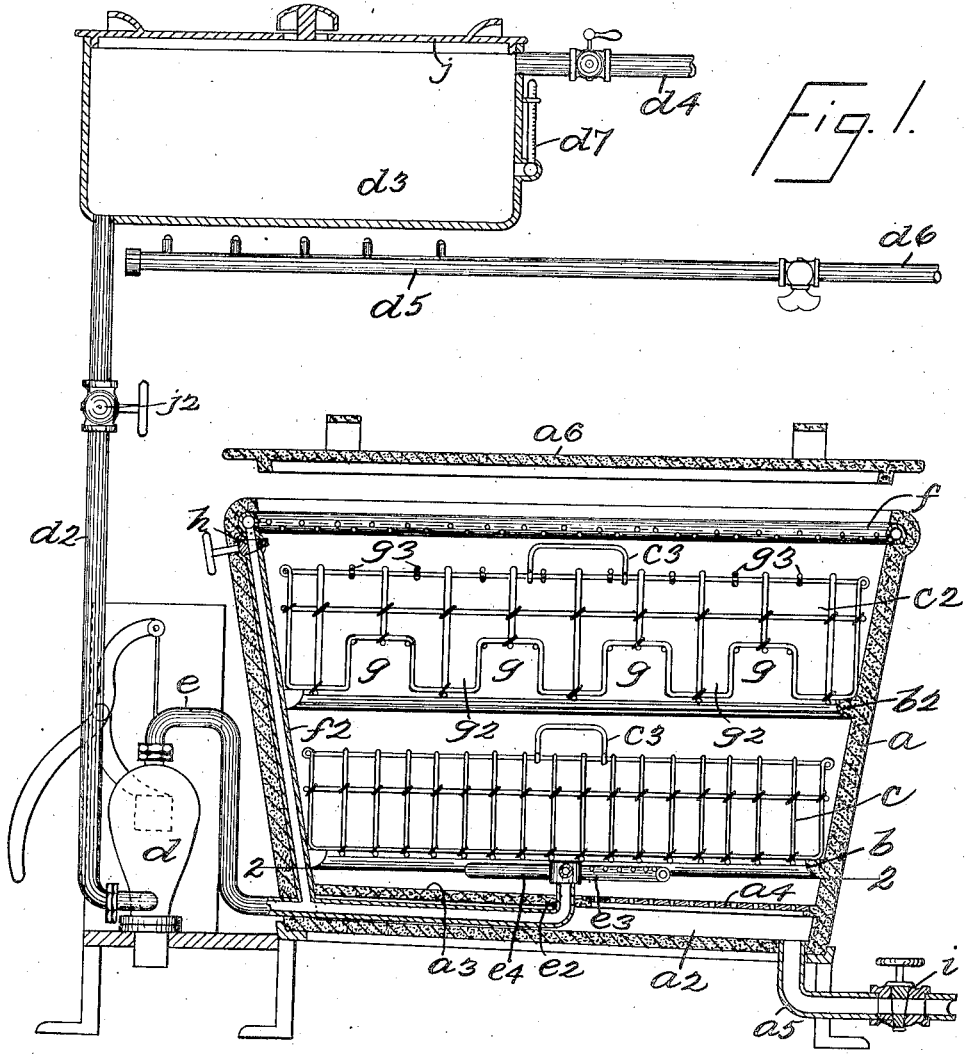

No. 821,250. PATENTED MAY 22, 1906.
C. B. MILLER.
DISH WASHING APPARATUS.
APPLICATION FILED OCT. 12, 1904.

WITNESSES
J. C. Larsen
F. A. Stewart

INVENTOR
Clara B. Miller
BY
Edgar Tate & Co.
ATTORNEYS

UNITED STATES PATENT OFFICE.

CLARA B. MILLER, OF SEWAREN, NEW JERSEY.

DISH-WASHING APPARATUS.

No. 821,250.　　　Specification of Letters Patent.　　　Patented May 22, 1906.

Application filed October 12, 1904. Serial No. 228,106.

*To all whom it may concern:*

Be it known that I, CLARA B. MILLER, a citizen of the United States, residing at Sewaren, in the county of Middlesex and State of New Jersey, have invented certain new and useful Improvements in Dish-Washing Apparatus, of which the following is a specification, such as will enable those skilled in the art to which it appertains to make and use the same.

This invention relates to dish-washing apparatus, and the object thereof is to provide an improved apparatus of this class which may be conveniently used in hotels, restaurants, and other places of this class, as well as in dwellings or for family use, a further object being to provide a dish-washing apparatus which is simple in construction and operation and comparatively inexpensive and by means of which all kinds and classes of dishes of any shape or form, together with pitchers, goblets, cups, glasses, and other hollow vessels, and also knives and forks may be quickly, easily, conveniently, and thoroughly washed; and with these and other objects in view the invention consists of an apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 2:
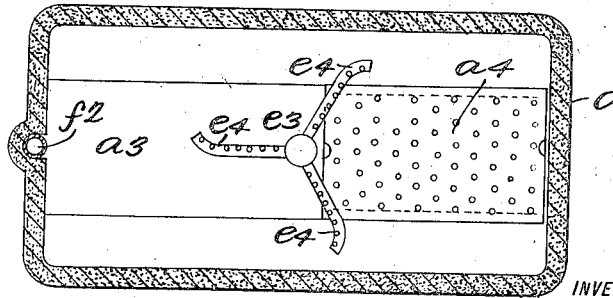

Figure 1 is a sectional elevation of an apparatus involving my invention, and Fig. 2 a section on the line 2 2 of Fig. 1.

In the practice of my invention I provide a tub $a$, which may be composed of any desired material and which, as shown in the drawings, is oblong in form, but which may be of any desired shape in cross-section. The sides and ends of the tub $a$ are inclined downwardly and inwardly in the form of construction shown, and in the bottom of the said tub and centrally thereof is a longitudinal trough $a^2$, formed by a false bottom $a^3$, in one end of which is a strainer $a^4$, and a draw-off or escape water-pipe $a^5$ communicates with one end of the trough $a^2$. The tub $a$ is provided in the form of construction shown at two different points with inwardly-directed supports $b$ and $b^2$, which extend around the sides and ends thereof, the bottom support $b$ being at a predetermined distance above the bottom of the tub and the top portion $b^2$ being preferably about half-way between the support $b$ and the top of said tub, and placed on the support $b$ is a tray $c$, composed of open wirework, and another tray $c^2$ is placed on the support $b^2$ and also composed of open wirework, and the trays $c$ and $c^2$ are provided with handles $c^3$, by which they may be removed from the tub $a$ and placed therein whenever desired.

Adjacent to the tub $a$ is placed a force-pump $d$, with which is connected the pipe $d^2$, which is in communication with a tank $d^3$, which is provided with a water-supply pipe $d^4$, and a gas-burner $d^5$ is placed under the tank $d^3$ for heating the same, and gas is supplied to said burner by a pipe $d^6$. The tank $d^3$ may be heated, however, in any desired manner, and said tank is provided at one end with a thermometer $d^7$, by which the temperature of the water therein may be determined. Connected with the pump $b$ is a water-lead pipe $e$, which extends into the bottom portion of the tub $a$ in the form of construction shown and through the trough $a^2$ to about the middle thereof, where it passes upwardly through the false bottom $a^3$ of the tub $a$, as shown at $e^2$, and connected therewith within the space between the support $b$ and the false bottom $a^3$ is a rotary water-sprayer $e^3$, having arms $e^4$, three of which are shown and the ends of which are all curved in the same direction, and these arms are finely perforated on their upper sides, as shown in Fig. 2.

In the top portion of the tub $a$ is placed a water-sprayer tube $f$, with which is connected a pipe $f^2$, which extends from the pipe $e$ within the tub $a$ up to and communicates with the water-sprayer tube $f$, and said water-sprayer tube $f$ is perforated on its bottom and inner sides, so as to throw water entirely over the tray $c^2$, while the perforations in the arms $e^4$ of the sprayer $e^3$ are so formed as to enable the said sprayer to throw water over the entire bottom portion of the tray $c$ and on and over the contents of said tray. The upper tray $c^2$ is intended for holding dishes or similar shallow articles, and the bottom of said tray is provided with transverse raised portions $g$, forming in the interior of said tray corresponding transverse depressed portions $g^2$, and the top of said tray is provided with transverse rods $g^3$, which correspond with the transverse raised portions $g$ and are directly over the opposite sides thereof, and in placing dishes, pie-pans, and other shallow articles in the tray $c^2$ the said articles are inserted into the tray between the transverse rods $g^3$ into the transverse depressed portions $g^2$ at the bottom of the tray, and said articles are thus held on edge, or substantially so. The bottom tray $c$, as hereinbefore stated, is intended to receive pitchers, cups, glasses, goblets, and other hollow articles of this class, and said articles are placed in said tray with the bottoms up, the open ends or mouths thereof being directed downwardly, and in the operation of the apparatus the dishes or other articles having been placed in the trays $c$ and $c^2$ and said trays having been placed in the tub $a$ the cover $a^6$ of said tub is placed in position and a quantity of boiling water is turned onto the dishes in the said trays, a teaspoonful, or thereabout, of powdered soap having been first dropped into the tub. The apparatus is then manipulated, so that the water will pass only to the bottom sprayer $e$, this operation being acomplished by means of a valve $h$ in the upper end portion of the pipe $f^2$. The pump $d$ is then operated for about two minutes, at the end of which time the valve $h$ is opened, and the water has access to the bottom sprayer $e^3$ and the top sprayer $f$. The pump $d$ is then operated for two or three minutes, at the end of which time the water is allowed to run off through the pipe $a^5$, which is provided with a valve $i$. A quantity of boiling water is then poured into the tub over the trays and the contents thereof, as at the beginning, and the pump is again operated for a minute or more, after which the cover $a^6$ is lifted and the water in the tub allowed to drain off, and the heat will be sufficient to dry the various articles in said trays in a few minutes, and the said articles may also be wiped in the usual manner, if desired, and may then be put away for use. The tank $d^3$ is also provided with a removable cover $j$, and said tank may be located at any desired point, and the pipe $d^2$, which communicates therewith, is provided with a valve $j^2$. The rotatable sprayer $e^3$ is preferably mounted on ball-bearings, which are not shown; but the mounting of this sprayer or its connection with the pipe $e$ may be made in any desired manner, the only object in this connection being to so mount the said sprayer that it will be caused to rotate freely by the force of the water flowing out of the curved ends of the arms $e^4$ thereof.

My invention is in no way limited to the exact construction of the trays $c$ and $c^2$, all that is necessary in this connection being that the said trays be composed of open wire-work, so as to permit the water to flow freely therethrough or through all parts thereof, another object being to so form the upper tray that dishes or flat or shallow pans or similar articles, such as pie-pans or the like, may be placed therein or supported therein on edge or in an inclined position in order that the water from the sprayer $f$ may be thrown over all parts thereof.

This apparatus is simple in construction and operation and comparatively inexpensive and may be used wherever apparatus of this class is required, and changes in and modifications of the construction herein described may be made without departing from the spirit of my invention or sacrificing its advantages.

Having fully described my invention, what I claim as new, and desire to secure by Letters Patent, is—

1. A dish-washing apparatus, comprising a tub the walls of which are inclined inwardly and downwardly and which is provided with a false bottom, a strainer forming a part of said bottom, an escape-pipe connected with the space beneath said false bottom, a rotary spraying device placed in the bottom portion of said tub, removable open trays placed thereover one above another and the top tray being provided with means for holding dishes and similar articles on edge, a spraying device placed around the top portion of said tub and means for supplying water under pressure to said spraying device, substantially as shown and described.

2. A dish-washing apparatus, comprising a tub having a false bottom, a strainer forming a part of said bottom, an escape-pipe connected with the space beneath said false bottom, a rotary spraying device in the bottom portion of said tub removable open trays placed thereover one above another, and the top tray being provided with means for holding dishes and similar articles in an upright position, a spraying device placed around the top portion of said tub and means for supplying water under pressure to said spraying device and means for heating said water, substantially as shown and described.

In testimony that I claim the foregoing as my invention I have signed my name, in presence of the subscribing witnesses, this 11th day of October, 1904.

CLARA B. MILLER.

Witnesses:
C. J. KLEIN,
F. A. STEWART.